United States Patent
Suzuki et al.

[11] Patent Number: 5,956,149
[45] Date of Patent: Sep. 21, 1999

[54] METHOD FOR DETERMINING REFERENCE POSITION

[75] Inventors: Yasuhiro Suzuki; Hiroyuki Moromoto, both of Iwata, Japan

[73] Assignee: Yamaha Hatsudoki Kabushiki Kaisha, Shizuoka-ken, Japan

[21] Appl. No.: 08/845,882

[22] Filed: Apr. 28, 1997

[30] Foreign Application Priority Data

Apr. 26, 1996 [JP] Japan .................................. 8-107742

[51] Int. Cl.$^6$ .................................................. G01B 11/14
[52] U.S. Cl. .......................................... 356/375; 356/400
[58] Field of Search .................. 356/399–401, 356/375

[56] References Cited

U.S. PATENT DOCUMENTS 4,615,093  10/1986  Tews et al. .
5,278,634   1/1994  Skunes et al. .
5,559,727   9/1996  Deley et al. .

*Primary Examiner*—Frank G. Font
*Assistant Examiner*—Amanda Merlino
*Attorney, Agent, or Firm*—Knobbe, Martens, Olson & Bear, LLP

[57] ABSTRACT

The reference position is determined, by using a test piece, for optically detecting the orientation of a component such as a chip for use in placement apparatus such as a chip mounter. Light is emitted from a light source toward a light sensor to cast a shadow of the test piece onto the light sensor. A first position of an end of the shadow when the pick-up device rotates at a first angle, a second position of the other end of the shadow when the pick-up device rotates at a second angle, and a third position of either end of the shadow when the pick-up device rotates at a predetermined third angle, are detected on the light sensor. Accordingly, the positional relationship of the light source, the light sensor, and the pick-up device is determined as a reference position, based on the positional data.

5 Claims, 14 Drawing Sheets

METHOD FOR DETERMINING REFERENCE POSITION

BACKGROUND OF THE INVENTION

This invention relates to an improved position-measuring technology sing diffused light, and particularly to a method and a system for determining the reference position to accurately locate components in placement apparatus such as chip mounters.

There is a considerable demand for devices that are capable of mounting or positioning small components such as integrated circuits, resistors, capacitors and the like at accurate locations on substrates such as printed circuit boards. This type of apparatus is generally referred to as a "chip" or "surface" mounter.

The components that are positioned are generally fed to the apparatus at a feeder location. Frequently, the components are positioned in specially-formed tapes that form individual pockets in which the components are received. Tape feeders present these components to a pick-up device which then picks them up and positions them on the substrate.

At one time, these components were accurately positioned on the pick-up apparatus by gripping fingers or other devices that physically engaged the component and would shift the component to a corrected position before placement. Many types of components do not, however, lend themselves to handling in this manner.

Therefore, a wide variety of types of non-contact sensors have been employed. These sensors sense the actual position of the component as picked up by the pick-up device. By being able to determine the actual position of the component, then correction in its position can be made when the component is positioned on the substrate.

This invention deals primarily with such a non-contact type of sensing arrangement and method. One type of arrangement which is conventionally utilized for providing this sensing utilizes a plurality of laser-type light sources that operate through optical devices to cast a plurality of parallel light rays across a sensing station in which the component and its pick-up device is positioned. A receptor is disposed on the other side of the pick-up device and component being held and a shadow is cast on that receptor. By rotating the component in the path of the light rays it is possible to measure the actual position of the component from the shift of the shadow and its size. These types of devices can be quite accurate.

In systems wherein diffused light is used, since diffused light can directly be used, optical devices such as lenses to emit parallel lights can be omitted. In the systems using diffused light, the position of a shadow cast oil a receptor is measured and determined with reference to the reference position or reference orientation. Thus, if the positional relationship of the receptor, the light source, and the pick-up nozzle deviates from the theoretical or designed positional relationship, accuracy of determination of orientation of a component will be significantly decreased. For example, if the position of the pick-up nozzle is slightly shifted toward either the receptor or the light source, the position of the shadow cast on the receptor will be significantly affected because the light emitted from the light source diffuses. Further, distortion is like to occur in each part of the apparatus with time, resulting in a decrease in accuracy. Accordingly, it is difficult to maintain high performance.

A principal object of this invention is to provide a method for accurately determining the reference position to improve accuracy of determination of the component's orientation.

SUMMARY OF THE INVENTION

This invention is adapted to be embodied in a method and system for determining the reference position for optically determining the position of a shadow cast on a receptor to detect the orientation of a component. In accordance with the method, a reference position is determined for optically detecting the orientation of a component. The method comprises the steps of: (i) picking up a test piece by a rotatable pick-up device, said pick-up device having an axis of rotation and being adapted to pick up the component, said test piece having corners with constant dimensions with respect to the axis of rotation; (ii) positioning the test piece between a light source and a light sensor, said light source emitting light diffusing toward the light sensor, said light sensor sensing light to detect the position of a shadow thereon; (iii) emitting light from the light source toward the light sensor and casting a shadow of the test piece onto the light sensor; (iv) detecting a first position of one end of the shadow when the pick-up device rotates at a first angle, where the distance between a given position and the first position on the light sensor is minimized; (v) detecting a second position of the other end of the shadow when the pick-up device rotates at a second angle, where the distance between the given position and the second position on the light sensor is minimized; (vi) detecting a third position of either end of the shadow when the pick-up device rotates at a predetermined third angle; and (vii) determining as a reference position the positional relationship of the light source, the light sensor, and the pick-up device, based on the positional data obtained in steps (iv)–(vi).

If the dimensions of the test piece are known, and if the test piece has sides wherein one side is shorter than the other side, detecting one end of the shadow at each side of the test piece which is rotated by approximately 90° may be sufficient.

By another method wherein slit-forming members are used instead of the test piece, a reference position can also be determined. The method comprises the steps of: (i) positioning a first pair of slit-forming members to form a first slit between a light source and a light sensor, said light source emitting light diffusing toward the light sensor, said light sensor sensing light to detect the position of a shadow thereon; (ii) positioning a second pair of slit-forming members to form a second slit between the light source and the light sensor and closer to the light sensor than is the first slit, said second slit being wider than said first slit; (iii) emitting light from the light source toward the light sensor through the first slit to cast a light spot having a width onto the light sensor; (iv) detecting the width of the light spot before and after narrowing the opening of the second slit until the width of the light spot cast on the light sensor is not narrowed; (v) partially blocking the light from the light source using a light-blocking member having an edge to narrow the light spot, and detecting the position of said edge of said light-blocking member; and (vi) determining as a reference position the positional relationship of the light source, the light sensor, and the pick-up device, based on the positional data obtained in steps (i)–(v).

According to the present invention, since the reference position is adjusted based on the actual positional relationship, compensation for misalignment can very accurately be determined, thereby achieving highly accurate operation of chip-mounting. The above determination of reference position can be conducted upon installation of a chip-mounting apparatus or before shipment thereof, or can be periodically conducted to renew data in the memory. Further, distortion which occurs in the chip-mounting apparatus with time can be compensated for by using the redetermined reference position. Accordingly, high performance can be maintained.

DETAILED DESCRIPTION OF THE PREFERRED EMBODIMENT

Figure 1:
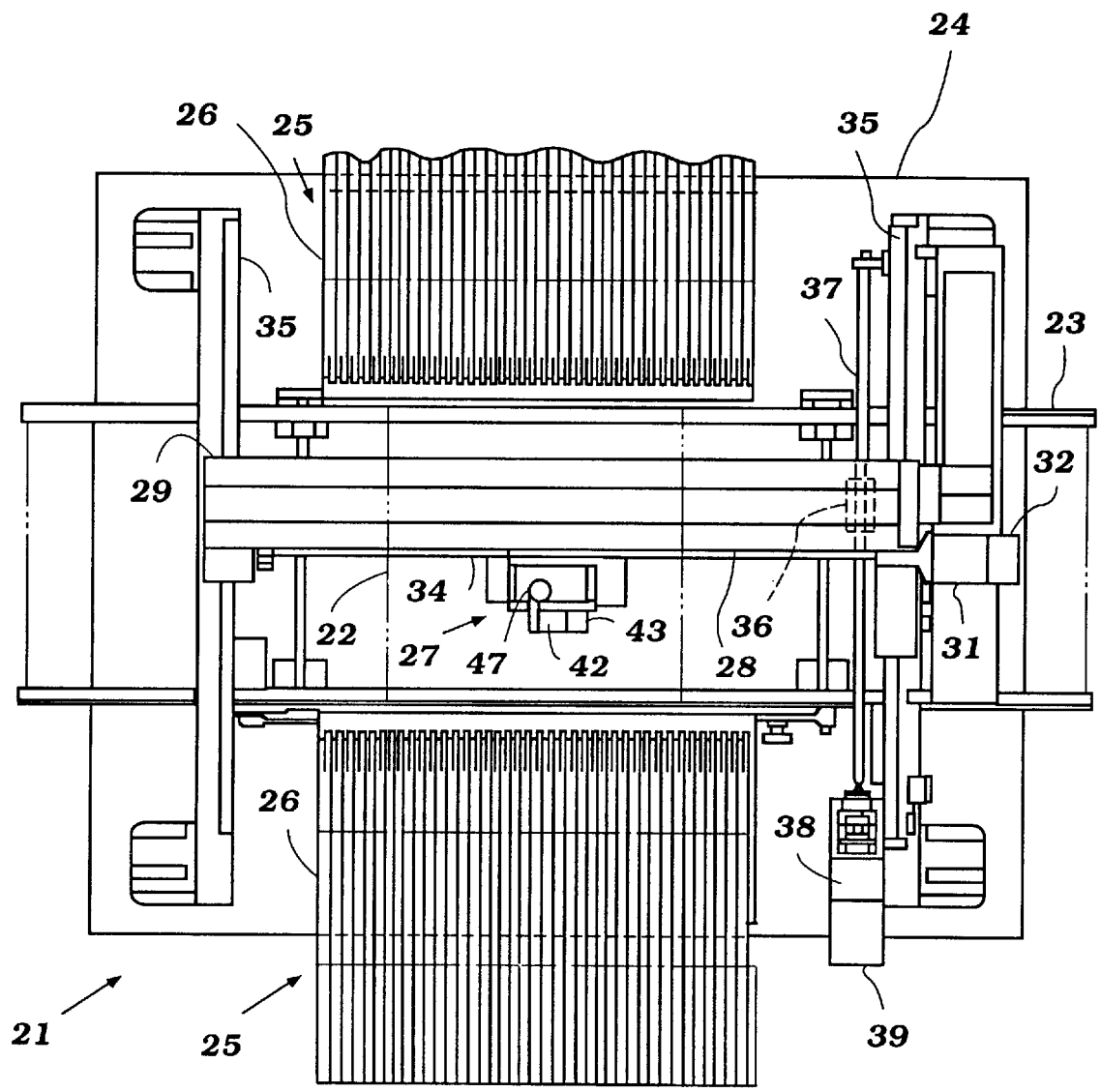
FIG. 1 is a top plane view of a mounting apparatus constructed and operated in accordance with an embodiment of the invention.
Figure 2:
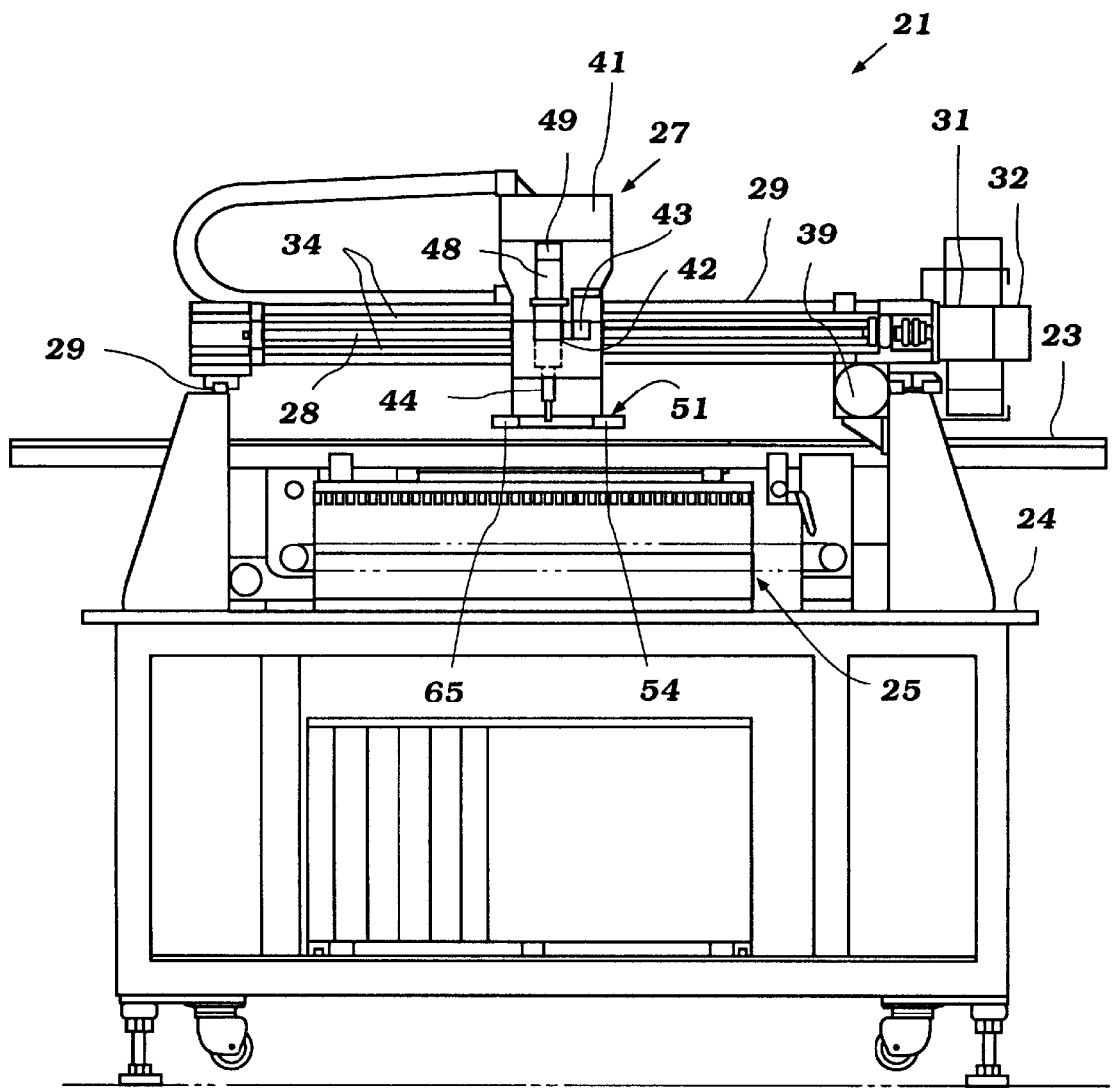
FIG. 2 is a front elevational view of the apparatus.

Referring now in detail to the drawings and initially to FIGS. 1 and 2, a chip-mounting apparatus constructed and operated in accordance with an embodiment of the invention is identified generally by the reference numeral 21. The chip-mounting apparatus 21 is adapted to mount small components such as IC's, resistors or capacitors on printed circuit boards 22 that are presented to a mounting station by a conveyor 23 which conveyor extends transversely across a table 24 of the apparatus 21.

These individual components are presented at delivery stations 25 that are positioned at opposite sides of the conveyor 23 and which are comprised of a plurality of individual ratchet-operated tape feeders 26. These types of devices are well known and each is comprised of a carrying tape having individual pockets in which the individual components are positioned. The actual pick-up or delivery stations 25 are positioned closely adjacent opposite sides of the conveyor 23.

A pick-up head assembly, indicated generally by the reference numeral 27 and having a construction that will be described, is mounted for movement between the delivery stations 25 and the circuit board 22 for picking tip the components and depositing them. In addition, certain other operations will be described later.

The head assembly 27 has a ball nut (not shown) that is engaged with a feed screw 28 which is, in turn, rotatably carried on a carriage 29. Rotation of the feed screw 28 moves the head assembly 27 in the X—X direction. A driving motor 31 is provided at one end of the carriage 29 for driving the feed screw 28. An encoder 32 is driven by the motor 31 and provides a signal to a control unit, indicated generally by the reference numeral 33 and as shown in the schematic view of FIG. 5. This figure shows the interrelationship of various components. Guide rails 34 are also provided on the carriage 29 for guiding the movement of the head assembly 27 in the X—X direction.

The carriage 29 is itself moveable along the Y axis, being mounted for this movement on a pair of parallel guide rails 35 that extend on opposite sides of the feeder stations 25 and perpendicularly to the path of the conveyor 23. The carriage 29 has a ball nut 36 that is engaged with a Y axis drive screw 37 which is journalled appropriately on the mechanism 21 and which is driven by an electric drive motor 38. An encoder 39 is coupled for rotation with the Y axis drive motor 38 so as to provide a signal indicative of the position of the pick-up head assembly 27 in the Y axis.

The head assembly 27 will now be described in detail by primary reference to FIGS. 1 and 2 and the interrelationship of the components is, as noted, shown schematically in FIG. 5. The head assembly 27 includes a support base 41 that is mounted for movement along the guide rails 34 and which supports a Z axis drive motor 42 having an encoder 43 that provides an output signal indicative of the position of the head assembly 27 along the Z axis. The Z axis drive motor 42 drives a feed screw (not shown) that has a connection to a ball nut of a pick-up head, indicated generally by the reference numeral 44. The pick-up head 44 is adapted to receive a pick-up nozzle 45 of the vacuum operated type.

The pick-up nozzle 45 is detachably connected to the pick-up head 44 so as to provide replacement to accommodate various types of components, indicated generally by the reference numeral 46, that may be picked up by the pick-up head 27.

The pick-up nozzle 45 is also rotatable about a rotational axis R and is driven for this rotation by a rotational R axis servomotor 48. The rotational axis servomotor 48 also drives an encoder 49 so as to provide an output signal indicative of the rotational position of the pick-up nozzle 45, for a reason which will be described.

Figure 3:
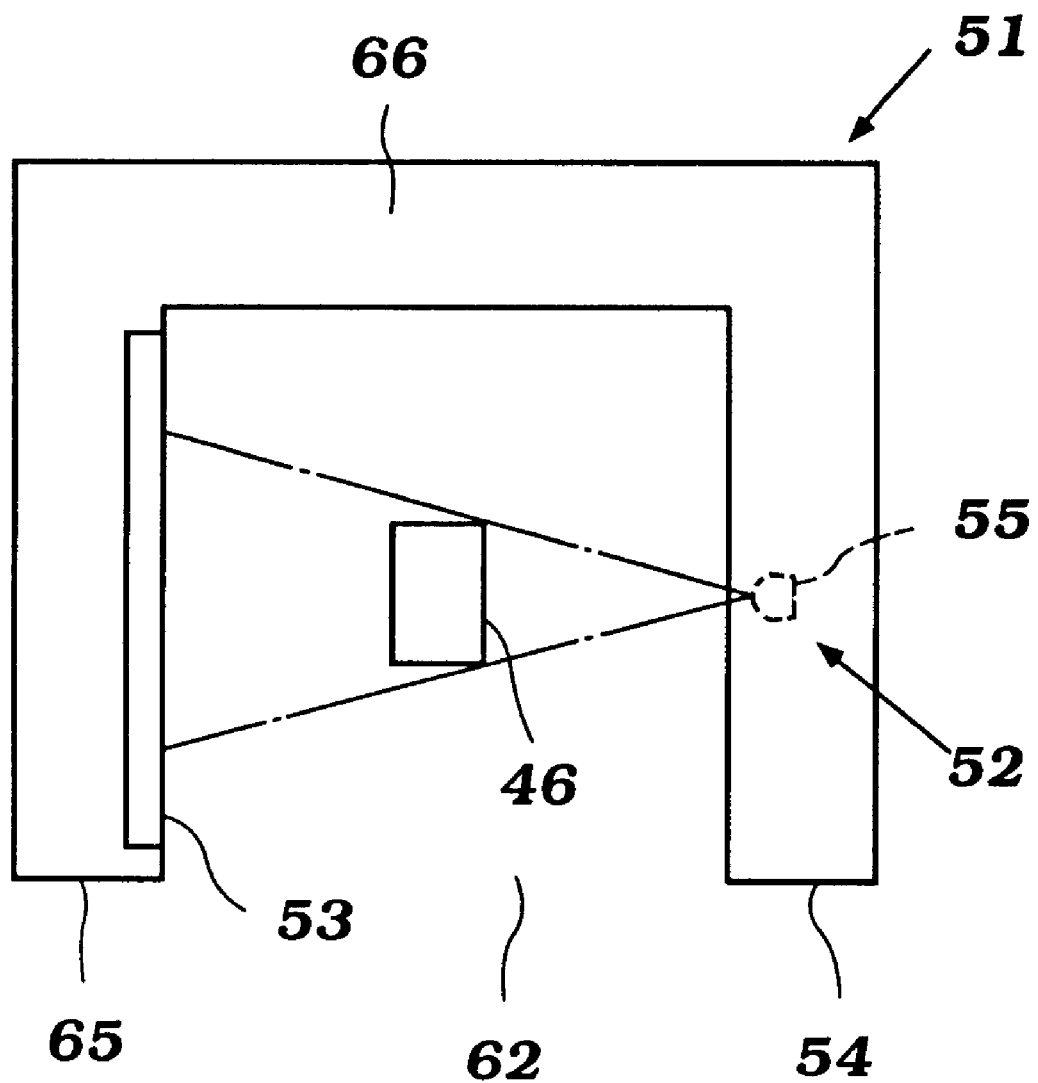
FIG. 3 is an enlarged top plane view showing the sensing station with a component reference therein.
Figure 4:
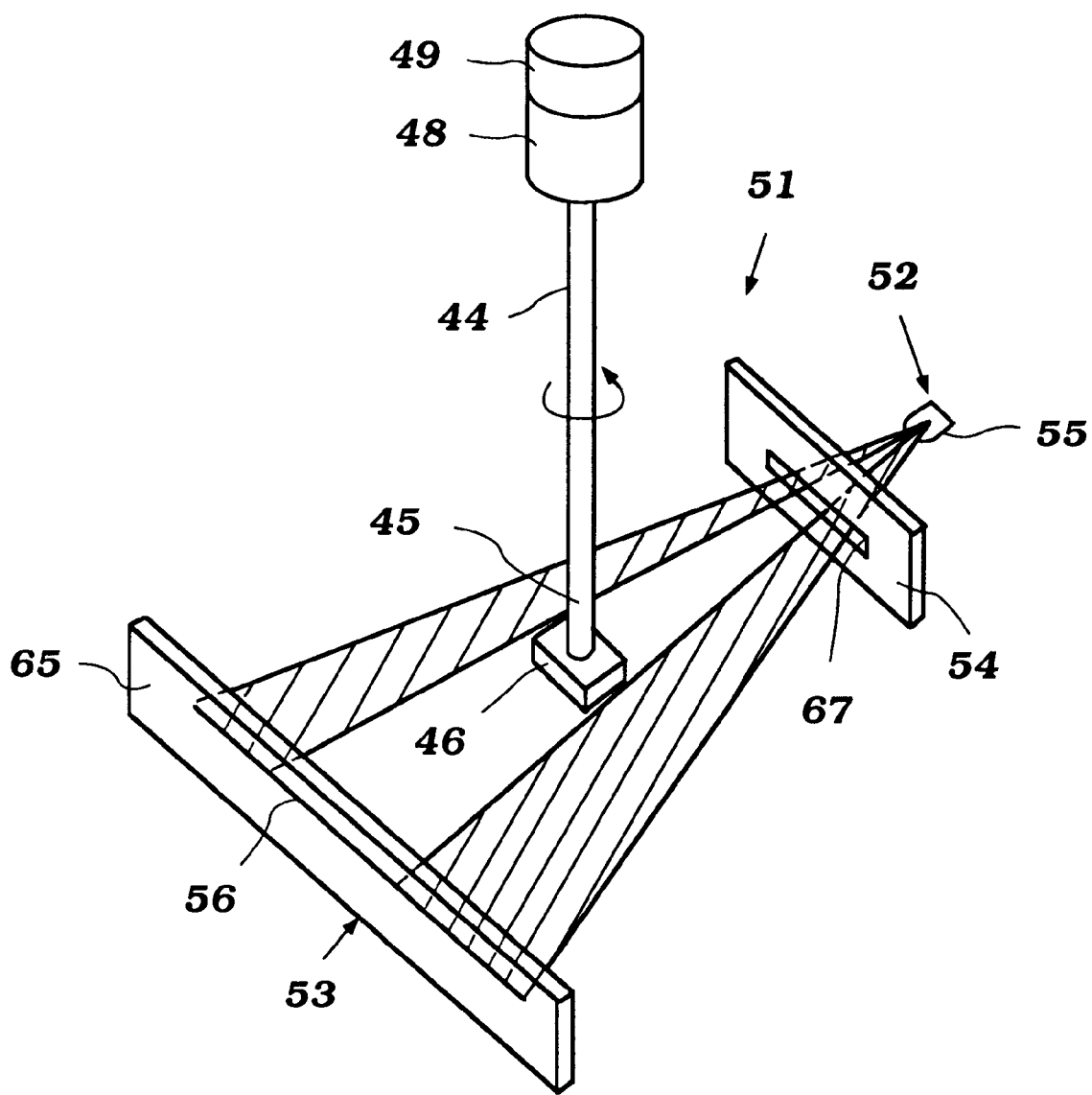
FIG. 4 is a perspective view schematically showing part of the sensing station.

Also mounted on the head assembly 27 and specifically the support base 41, is a sensor device, indicated generally by the reference numeral 51 which, in the illustrated embodiment, is an optical sensor that comprises a light source indicated generally at 52 that emits diffused light rays as shown in FIG. 3 and 4 to a detector or receptor unit in the form of a CCD 53. The detector unit 51 functions, as will become apparent, so as to sense objects which obscure the light rays as determined by the output of the sensor 53. The output of the sensor 53 is transmitted to the control unit 33 (FIG. 5).

The construction of the sensing station 51 is shown best in FIGS. 3 and 4. It will be seen that this includes a frame member 66 that has a roughly C-shaped configuration with the light source 52 being mounted on one leg 54 thereof. The light source 52 in this embodiment is composed of an individual diode light elements (LED's) 55. The light source emits a diffused light toward the receptor 53 across a gap 62 formed between the leg 54 and a leg 65 on which the receptor 53 is mounted. The components 46 are disposed therebetween in an orientation as will be described.

The legs 54 and 65 are connected together by a bridging leg 66 formed at one side of the gap 62. It will be seen that the leg 54 has a face that is defined with a slot or slit 67 that restricts the light rays emitting from the LED's 55 to an area that will encompass the height of the component 46 when the pick-up nozzle 45 is located in the sensing station 51 and specifically across the gap 62. This eliminates stray light rays and provides a more accurate signal and indication of the condition of the component 46 relative to the pick-up nozzle 45.

The manner in which the sensing device 51 provides information which can be utilized to calculate the orientation of the component 46 relative to the pick-up nozzle 45 will be described by reference primarily to FIGS. 6–14. Basically, the concept operates by providing a light ray that extends across the gap 62 so that the component 46 will cast a shadow on the receptor 53 (a line sensor) with the non-obscured light rays indicated by the hashed arcs shown in FIG. 4. By detecting the lateral position of the shadow along the receptor 53 and comparing it with the reference position, it is possible to generate sufficient information so as to determine the orientation of the components. This may be done by locating one edge of the component 46 and by comparing it with the reference position, as will be described by reference to FIGS. 6–14. Although adequate information may be obtained by sensing only one corner of the component, more accurate locations can be determined by sensing two and in some instances three corners of the component.

Figure 5:
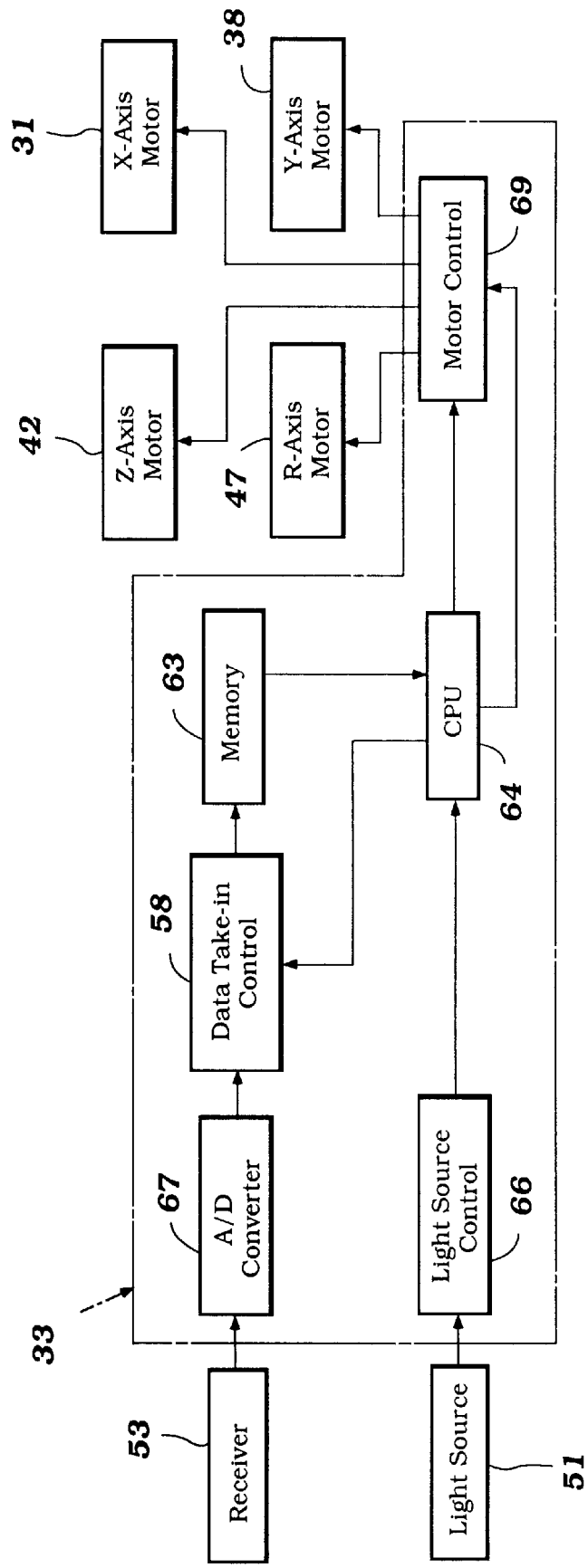
FIG. 5 is a block diagram showing the relationship of the various components of the system.

Before describing the method of determining the reference position, the apparatus which has been previously referred to and which is shown in FIG. 5 will be described particularly. As noted, the apparatus includes a control 33 and this includes as a base component, a CPU 64 and associated memories 63. The CPU 64 controls the light sources through a light source control section 66 of the control 33. This illuminates LED's 55. In addition, the receiver 53 outputs data indicative of the shadows to the control 33 and specifically to an analog to digital (A/D) converter 67 thereof. This analog digital converter outputs its digital signals to a data intake control section 58 which is controlled by the CPU 64 and which outputs its data to the memory 63.

The CPU 64 then computes from the accumulated data the corrections required to correctly position the component and output signals to a motor control section 69. This motor control section controls the X-, Y-, Z-, and R-axis motors 31, 38, 42, and 48, so as to appropriately position the component and to correct the reference for final positioning on the printed circuit board or substrate 22. The method and structure by which the actual positioning is of the type known in this art and can be practiced by any of the known placement apparatuses.

A process including a detection process of detecting the reference of a component will be explained below based on the flowchart of FIG. 6 with reference to FIGS. 7 and 8.

Figure 6:
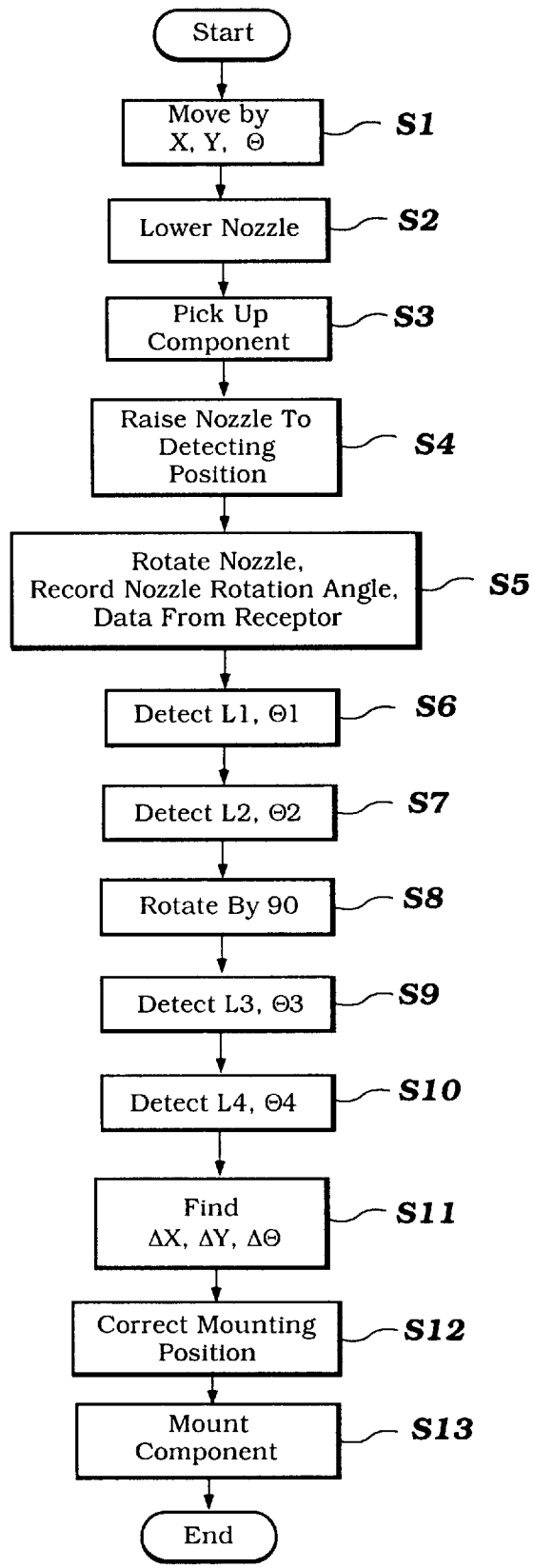
FIG. 6 is a flowchart showing the steps of pick-up operation including determination of the orientation of a component.

When the process indicated in FIG. 6 starts, first, head unit 44 moves in the X and Y directions, and nozzle member 45 rotates at one rotation angle of θ (step S1). When it moves to a given position, the nozzle member 45 starts descending (step S2), and picks up a component (a chip piece) 46 (step S3). Until the component 46 is raised to a position corresponding to the detection unit 26, the light source 52 and the receptor 53 where detection takes place, the nozzle member 45 ascends (step S4). When the component is positioned, the following processes of detecting the position or orientation start.

Processes of detection include reading detection data from the receptor 53 of the detection unit 26 and the angle of rotation of the nozzle at each rotation while the nozzle member 45 rotates at one given minute angle at a time (step S5). Distance L1 and angle θ1 of nozzle rotation are detected (step S6) where the distance between the given reference position and one end of the shadow cast on the receptor is minimized as shown by a solid line in FIG. 7. Distance L2 and angle θ2 of nozzle rotation are detected (step S7) where the distance between the given reference position and the other end of the shadow cast on the receptor is minimized as shown by a double dotted line in FIG. 7. The nozzle member then rotates at approximately 90° (step S8). As with the processes in steps S6 and S7, distance L3 and nozzle angle θ3 are detected (step S9) where the distance between the given reference position and one end of the shadow cast on the receptor is minimized (shown by a solid line in FIG. 8). Distance L4 and nozzle angle θ4 are detected (step S10) where the distance between the given reference position and the other end of the shadow cast on the receptor is minimized (shown by a double dotted line in FIG. 8). Based on detection data obtained by steps S6–S10, compensations ΔX, ΔY, and ΔZ, to compensate for the misalignment in the component as picked up by the nozzle member, are determined (step S11).

Figure 7:
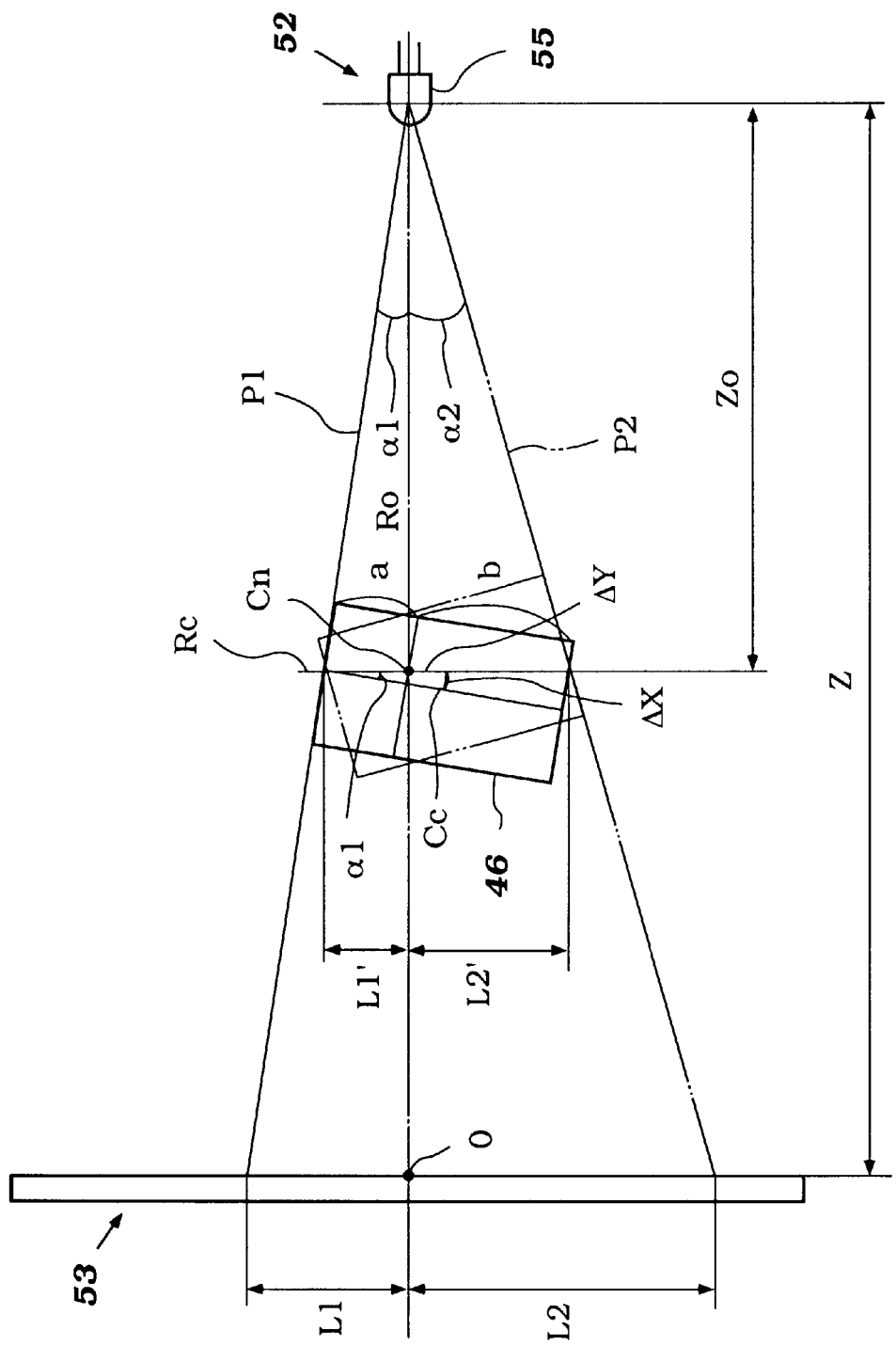
FIG. 7 is a graphic view showing one step of determining the orientation of a component using a single diffused light source.
Figure 8:
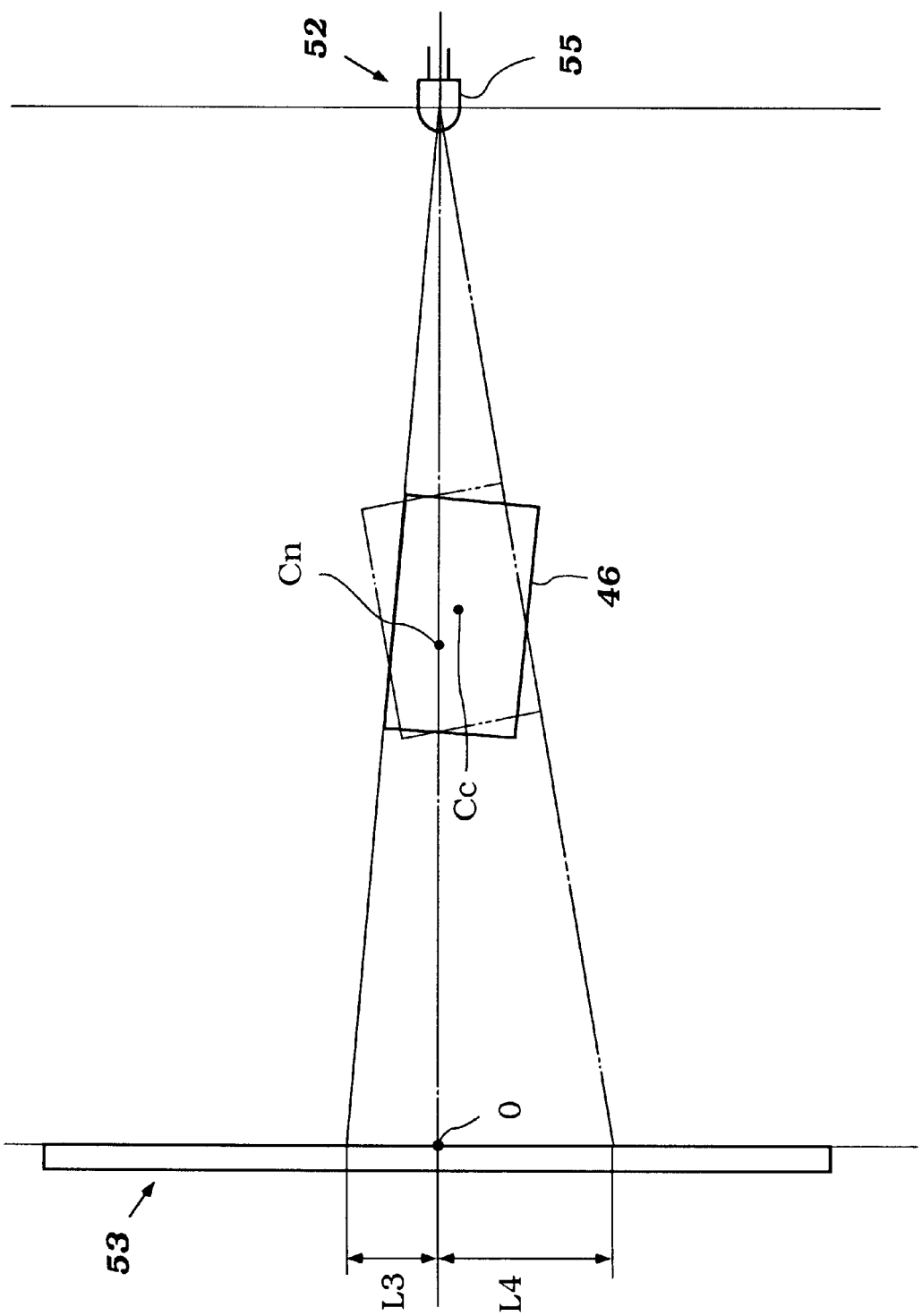
FIG. 8 is a graphic view showing another step of determining the orientation of a component using a single diffused light.

With reference to FIGS. 7 and 8, the above processes will be explained. In these figures, Cn is the center of rotation of the component, i.e., the center of the nozzle 45, Cc is the center of the component, O is the origin located on the receptor 53, corresponding to the light element 55 (the reference posit-ion), Ro is a center line connecting the origin O and the light element 55, and Rc is a line passing through the nozzle center Cn and perpendicular to the center line Ro. In this embodiment, the nozzle center Cn is located above the center line Ro, and the center line Ro is perpendicular to the direction of alignment of line sensors 56 of the receptor 53.

If parallel lights are used, by detecting a shadow cast on the receptor when the width is minimized, it is possible to determine compensation amounts to compensate for the misalignment. However, if a spot light is used as in the present invention, it is impossible to determine compensation amounts based on the above approach, and thus, a special process is required. When the line between the origin O and one end of the shadow of the component on the receptor 53 is shortest, the position indicates that one side of the component 46 (the upper side in FIG. 7) is aligned with a Ray P1 emitted in a specific direction from the light source 55 as shown by a solid line in FIG. 7. When the line between the origin O and the other end of the shadow of the component on the receptor 53 is shortest, the position indicates that one side of the component 46 (the lower side in FIG. 7) is aligned with a specific Ray P2 from the light source 55 as shown by a double dotted line in FIG. 7.

When L1 is defined as the distance between the origin O and one end of the shadow of the component cast on the receptor 53 as shown by the solid line, the distance (a) between the nozzle center Cn and one side of the component is calculated as follows:

$$L1' = (Zo/Z) * L1$$
$$\cos \alpha 1 = Z/\sqrt{(Z^2 + L1^2)}$$
$$a = L1' * \cos \alpha 1 = Zo * L1/\sqrt{(Z^2 + L1^2)} \quad \text{[Equation 1]}$$

When L2 is defined as the distance between the origin O and the other end of the shadow of the component cast on the receptor 53 as shown by the double dotted line, the distance (b) between the nozzle center Cn and the other side of the component is calculated as follows:

$$L2' + (Zo/Z) * L2$$
$$\cos \alpha 2 = Z/\sqrt{(Z^2 + L2^2)}$$
$$b = L2' * \cos \alpha 2 = Zo * L2/\sqrt{(Z^2 + L2^2)} \quad \text{[Equation 2]}$$

In the above, the symbols denote the following:

Zo: A distance from the light source 52 to the nozzle center Cn.

Z: A distance from the light source 52 to the receptor 53.

L1: A distance from the nozzle center Cn to one edge of the component 46 along straight line Rc.

L2: A distance from the nozzle center Cn to the other edge of the component 46 along straight line Rc.

α1: an angle of the Ray P1 with respect to the center line Ro.

α2: an angle of the Ray P2 with respect to the center line Ro.

In the above, Zo and Z are measured in advance. Thus, by measuring distance L1 and L2, it is possible to determine a and b. In addition, angles α1 and α2 are calculated as follows:

$$\alpha 1 = \text{arc cos } \{Z/\sqrt{(Z^2+L1^2)}\}$$

$$\alpha 2 = \text{arc cos } \{Z/\sqrt{(Z^2+L2^2)}\} \quad \text{[Equation 3]}$$

ΔY, a compensation in the Y-direction, and Δθ, a compensation for rotation, are indicated as follows:

$$\Delta Y = a - (a+b)/2$$

$$\Delta \theta = \theta 1 - \alpha 1 \quad \text{[Equation 4]}$$

Δθ is an angle of rotation of the nozzle at a position shown by the solid line in FIG. 7.

After the nozzle member 45 rotates at approximately 90° from a position shown in FIG. 7, L3, which is defined as the distance between the origin O and one end of the shadow of the component cast on the receptor 53 as shown by the solid line in FIG. 8, and L4, which is defined as the distance between the origin O and the other end of the shadow of the component cast on the receptor 53 as shown by the double dotted line in FIG. 8, are measured. The distances (c and d) between the nozzle center Cn and the respective sides of the component and the compensation ΔX in the X-direction are calculated as follows:

$$c = Zo*L3/\sqrt{(Z^2+L3^2)}$$

$$d = Zo*L4/\sqrt{(Z^2+L4^2)}$$

$$\Delta X = c - (c+d)/2 \quad \text{[Equation 5]}$$

Detection of distances L1–L4 and calculation of Equations 1–5 are conducted pursuant to steps S5–S11 shown in the flowchart of FIG. 6.

After the above processes are complete, orientation adjustment of the component is conducted based on compensations ΔX, ΔY, and Δθ (step S12). That is, in order to move the nozzle member 45 in the X- and Y-directions by compensations ΔX and ΔY to the target position coordinated by the X and Y axes, the X-axis and T-axis servomotors 31 and 38 are activated, and to rotate the nozzle member 45 by compensation Δθ to the target angle of rotation, the R-axis servomotor 24 is activated. The nozzle member 45 then descends so that the component 46 can be fitted on a print board 3 (step S13).

In the above embodiment wherein a diffused spot light is used, as compared with detection systems using a plurality of parallel lights, the structures can be simplified and can be compact. Further, in this embodiment, accuracy of orientation of components is higher than the other detection systems, because compensations ΔX, ΔY, and Δθ for compensating for the misalignment can be accurately determined using Equations 1–5 based on detected values of L1–L4 and θ1–θ4.

However, if the positional relationship of the component and the sensing unit is not accurately represented by the detected data, the detection system does not work well. For example, if the positional data of the center line Ro and the origin O obtained by the system are different from their actual positions, L1, the distance between the origin O and the end of the shadow, cannot be determined. Further, if the positional data of Zo, the distance between the light source 55 and the nozzle center Cn, or Z, the distance between the light source 55 and the receptor 53, is different from the actual position, errors will be generated in calculation of compensations ΔX, ΔX, and θΔ, resulting in deviation from accurate compensation amounts.

Thus, in this system, the origin O is determined based on the actual positional relationship of the light source 52, the receptor 53, and the nozzle member 45. Using the determined origin O, positional data regarding the light source 52, the receptor 53, and the nozzle member 45 are obtained, i.e., a process of determining reference references.

Figure 10:
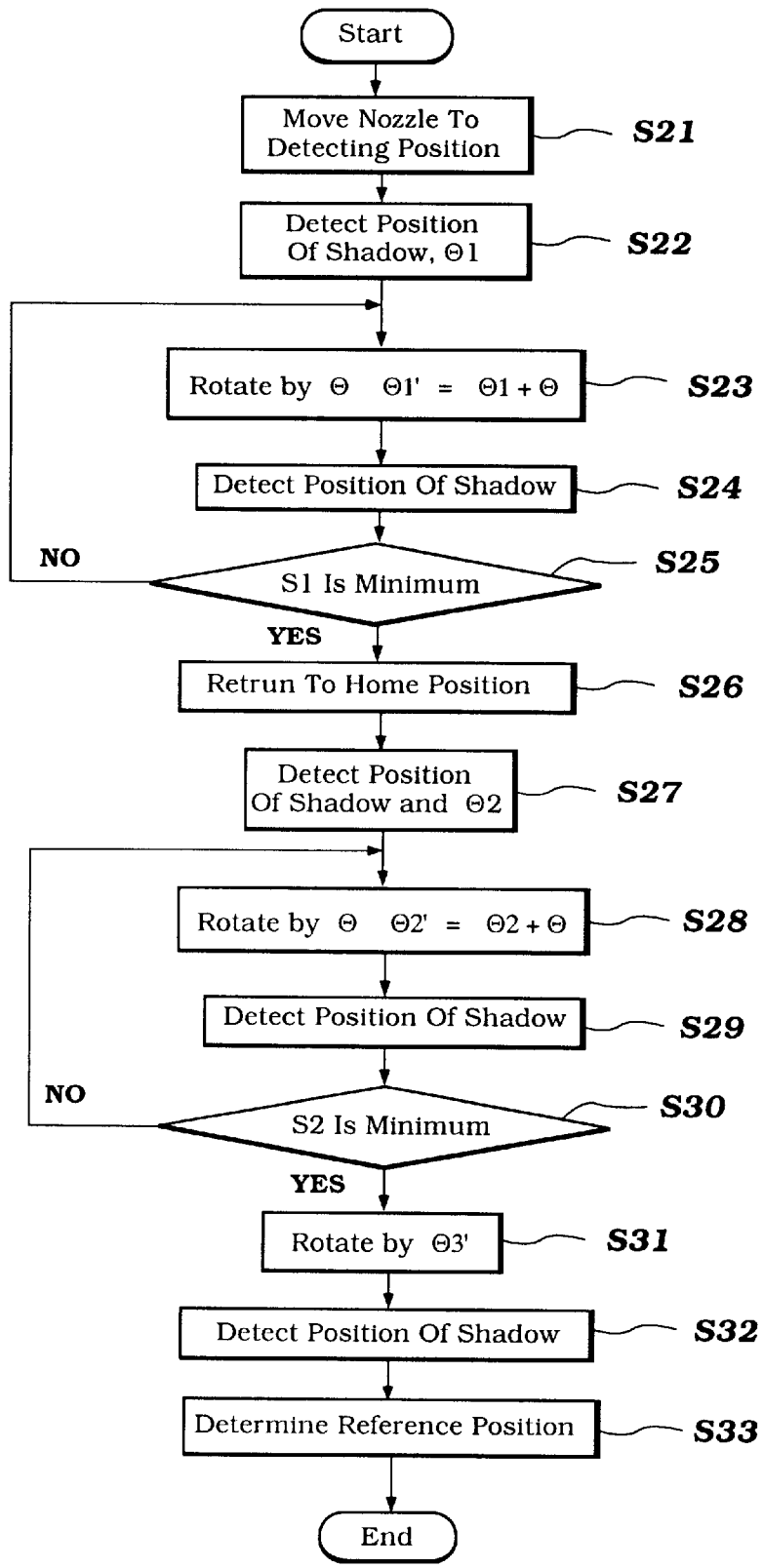
FIG. 10 is a flowchart showing the steps of determining the reference position using a dummy member.
Figure 11:
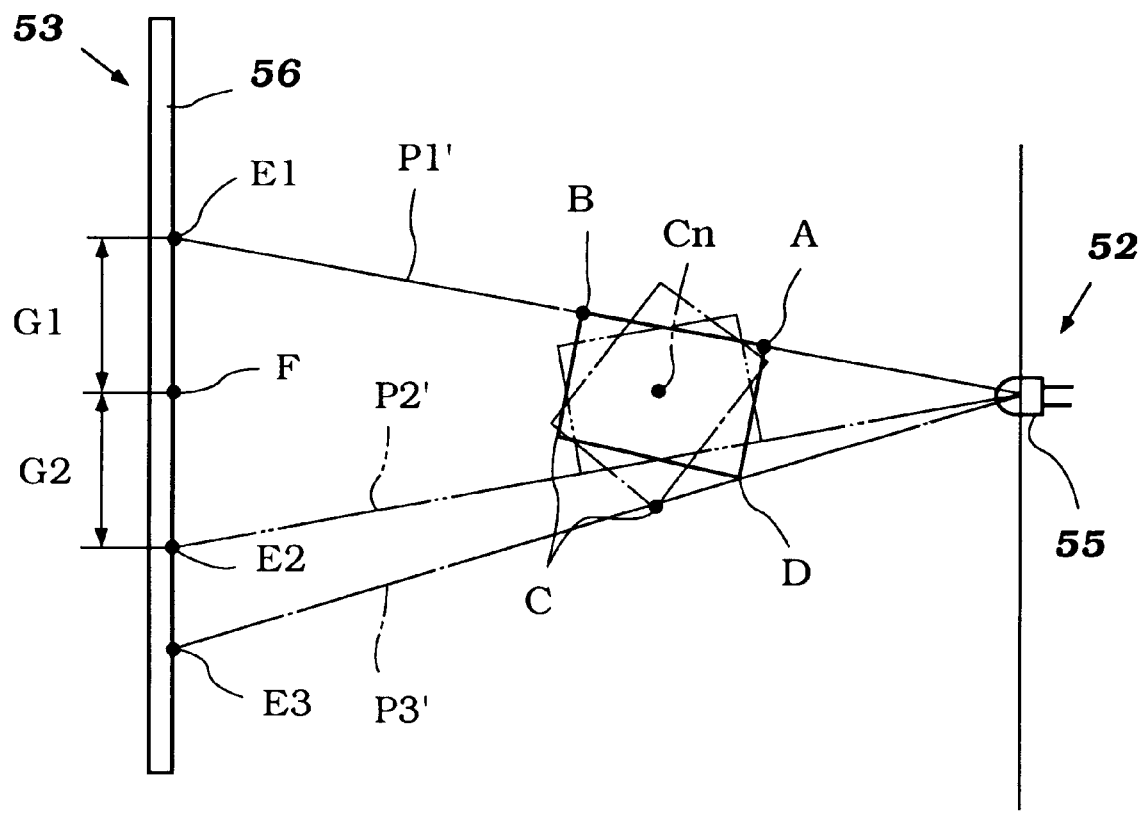
FIG. 11 is a graphic view showing one step of determining the reference position using a dummy member.
Figure 12:
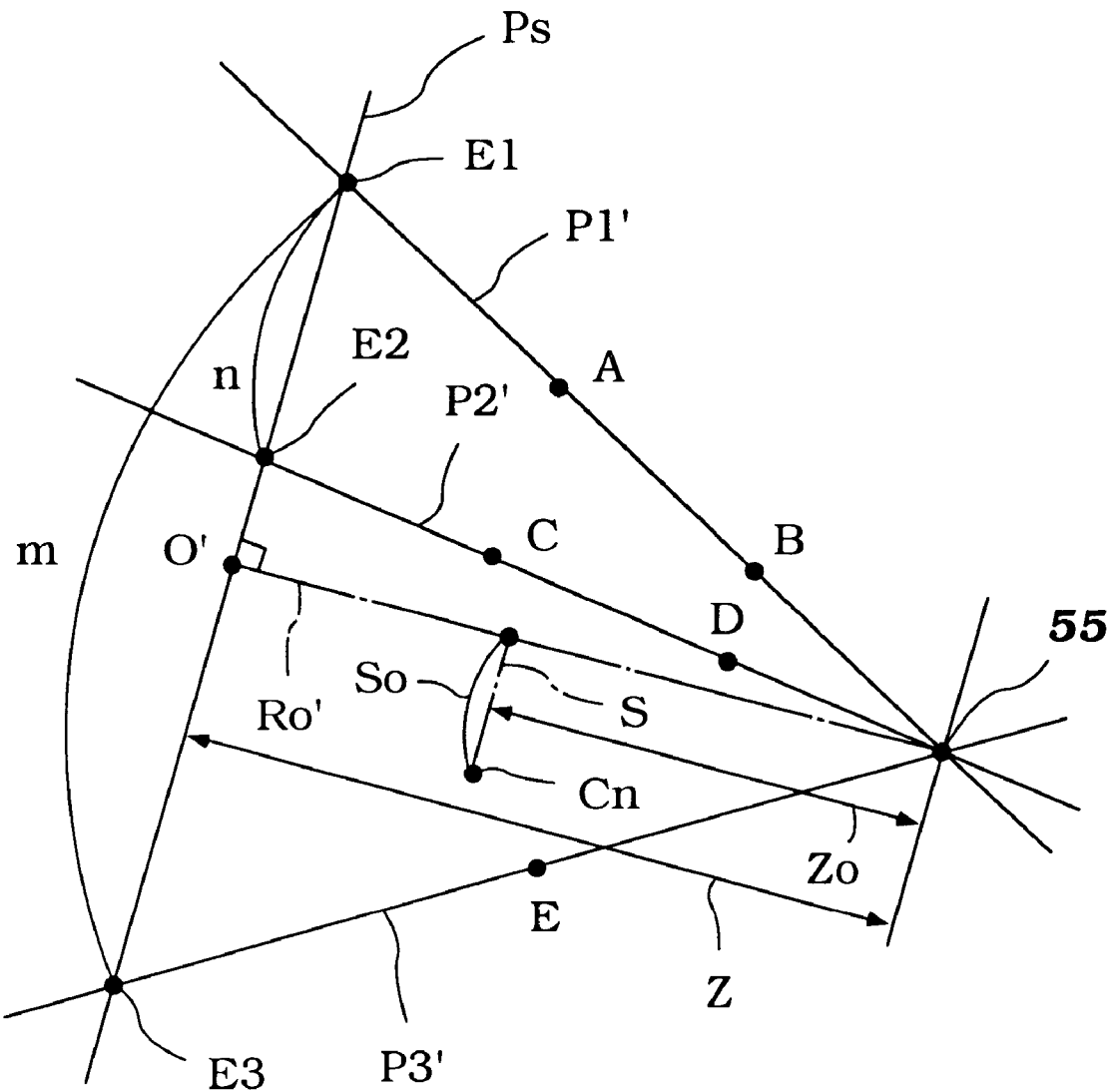
FIG. 12 is a graphic view showing how the reference position is determined.

With reference to FIGS. 11 and 12, the flowchart of FIG. 10 will be explained below.

In determination of the reference references, a dummy member 46 is picked up by the nozzle member 45, and the nozzle member 45 is positioned at a given height corresponding to the light source 52 and the receptor 53 and rotated at a given angle (step S21).

The dummy member 46 has highly accurate dimensions and configuration, and is designed to receive the point of the nozzle in the center and to be fitted thereto. Thus, the position of each corner with respect to the center of the nozzle can be accurately detected.

After installing the dummy member 46, the nozzle member 45 rotates at one given minute angle (θ) at a time. At each rotation, the data from the receptor 53 of the detection unit 26 and the angle of rotation of the nozzle are input. The position of the end of the shadow cast on the receptor 53 and angle θ1' of nozzle rotation are detected (step S22–25) where the distance between the central point (the specific position) of the receptor 53 and one end of the shadow cast on the receptor 5 is minimized as shown by a solid line in FIG. 11. After the nozzle member 45 is reset to return to the standard position (step S26), the position of the end of the shadow ast on the receptor 53 and angle θ2' of nozzle rotation are detected (steps S27–30) w ere the distance between the central point of the receptor 53 and the other end of the shadow cast on the receptor 53 is minimized as shown by a double dotted lin in FIG. 11. Further, the nozzle member 45 is set at predetermined rotation angle θ3', and the position of one end of the shadow cast on the receptor 53 is detected as shown by a single dotted line in FIG. 11 (steps S31–32).

Based on the these values obtained by steps S22–32, the position of the origin O of the receptor 53 is determined, and the positional data regarding the light source 52, the receptor 53, and the nozzle member 45 are obtained (step S33).

With reference to FIGS. 11 and 12, step S33 will be further explained below. In these figures, F is the central point on the receptor 53; A, B, C, and D are the respective corners of the dummy member 46; and E1–E3 are the positions of an end of the shadow cast on the receptor 53.

First, when G1, the distance between central point F and one end of the shadow of dummy member 46 cast on the receptor 53, is minimized, one side of the dummy member 46 (the upper side, A–B, in FIG. 11) is aligned with a lay P1' emitted in a specific direction from the light element 55 as shown by a solid lin in FIG. 11. When G2, the distance between central point F and the other end of the shadow of dummy member 46 cast on the receptor 53, is minimized, the other ide of the dummy member 46 (the lower side, C–D, in FIG. 11) is aligned with a lay P2' emitted in a specific direction from the light element 55 as shown by a double dotted line in FIG. 11.

The relative position of corners A and B of the dummy member 46 along the lay P1' with respect to the center Cn of the nozzle, and the relative position of co ers C and D of the dummy member 46 along the lay P2' with respect to the center Cn of the nozzle, can be determined based on the configuration of the dummy member 46 and angles θ1 and θ2 of nozzle rotation. Accordingly, it is possible to calculate an equation of a straight line for each Ray P1' and lay P2' on the coordinate system of this apparatus based on each position of A, B, C, and D. Further, since the coordinates of the light element 55 is an intersection point of lays P1' and P2', it is possible to determine the position of the light element 55 using the equation of a straight line for each of lays P1' and P2'.

In addition, when the nozzle member 45 rotates at an angle of θ3', the position of comer C can be determined based on the configuration of the dummy member 46 and angles θ3' of nozzle rotation. Thus, the equation of a straight line for Ray P3', which forms the end of the shadow cast on the receptor 53 via corner C of the dummy member 46, can be determined based on the position of comer C and the light element 55.

It is assumed that the equations of straight lines for Rays P1'-P3' indicated on the coordinates of the instant apparatus (referred to as straight lines P1', P2', and P3', respectively) are expressed as follows:

$$P1';y=a1*x+b1$$
$$P2';y=a2*x+b2$$
$$P3';y=a3*x+b3 \qquad \text{[Equation 6]}$$

Further, by changing the coordinates in such a way that the light element 55 is the center, straight lines P1'-P3' can be expressed as follows:

$$P1';y=a1*x$$
$$P2';y=a2*x$$
$$P3';y=a3*x \qquad \text{[Equation 7]}$$

In the above, when the arrangement of the line sensor 56 of the receptor 3 is considered as straight line Ps, Ps can be expressed as follows:

$$Ps;y=as*x+bs \qquad \text{[Equation 8]}$$

Straight line Ps, the light element 55, the nozzle center Cn, and straight lies P1', P2', and P3' can be schematically expressed as shown in FIG. 12.

In the above, the coordinates where straight lines P1'-P3' intersect with straight line Ps, i.e., the coordinates of the end positions of a cast shadow, E1-E3, on the receptor 53, are assumed to be E1(x1, y1), E2(x2, y2), and E3(x3, y3), and the distances between E1 and E2 and between E1 and E3 the receptor 53 denote n and m, respectively.

$$n^2=(x1-x2)^2+as^2(x1-x2)^2$$
$$m^2=(x1-x3)^2+as^2(x1-x3)^2 \qquad \text{[Equation 9]}$$

The above equations are generated, and using Equations 7 and 8, the following equations can be determined.

$$n^2(a1-as)^2(a2-as)^2=bs^2(1+as)^2(a2-a1)^2$$
$$m^2(a1-as)^2(a3-as)^2=bs^2(1+as)^2(a3-a1)^2 \qquad \text{[Equation 10]}$$

In the above, distances n and m can be obtained from the detected positions of cast shadows, E1-E2, and the pitch of the line sensor 56. Thus, straight line Ps can be defined since as and bs can be determined based on the two equations of Equation 10.

In the above, the relation, af=−1/as, is satisfied, assuming that straight line Ro', which is parallel to straight line Ps and passes through the light element 55 is expressed as follows:

$$Ro';y=af*x \qquad \text{[Equation 11]}$$

This equation can be changed to the following:

$$Ro';y=-1/af*x \qquad \text{[Equation 12]}$$

The coordinates of the intersection point of straight line Ps and a line extending from the light element 55 and perpendicular to straight line Ps, i.e., the position (xo, yo) of the origin O on the receptor 53, are determined based on Equations 8 an 12 as follows:

$$xo=-as*bs/(1+as^2)$$
$$yo=bs/(1+as^2) \qquad \text{[Equation 13]}$$

Further, the coordinates of the edge of the cast shadow E1(x1, y1) are determined based on Equations 7 and 8 as follows:

$$x1=bs/(a1-as)$$
$$y1=a1*bs/(a1-as) \qquad \text{[Equation 14]}$$

Thus, when the pitch of the sensing elements (the line sensor 28 is composed of aligned plural sensing elements) is W, and sensing element No. P counted from the first sensing element corresponds to E1, the position of the end of the cast shad w, sensing element No. Po which corresponds to the origin O can be expressed, based on Equations 13 and 14, as follows:

$$Po=P+1/W\sqrt{\{(xo-x1)^2+(yo-y1)^2\}} \qquad \text{[Equation 15]}$$

In the above, because W is known, and number P is detectable, sensing element No. Po located at the origin O can be calculated from Equation 15.

Based on Equation 12, Z, the distance between the light element 55 and the receptor 53, is expressed as follows:

$$Z=|bs|N/\sqrt{(1+as^2)} \qquad \text{[Equation 16]}$$

When the coordinates of the nozzle center Cn are (xc, yc), and the straight ine, which passes through the nozzle center Cn and which is perpendicular to straight line Ro', is referred to as straight line S, straight line S can be expressed as follows:

$$S;y=as*x+(yc-as*xc) \qquad \text{[Equation 17]}$$

Thus, Zo, which denotes the distance between the light element 55 and the intersection point of straight lines Ro' and S, i.e., the distance between the light element 55 and the nozzle center Cn, is expressed as follows:

$$Zo=|yc-as*xc|/\sqrt{(1+as^2)} \qquad \text{[Equation 18]}$$

Further, So which denotes the distance between the nozzle center Cn and the perpendicular line extending from straight line Ro' is expressed as follows:

$$So=|yc-1/as*xc|/\sqrt{\{(1+(1/as^2)\}} \qquad \text{[Equation 19]}$$

Determination of the position of the origin O on the receptor 53, and calculation of distances Z, Zo, and So are conducted in step S33. This process is carried out in CPU31, and the data such as determined distance Z are saved in the memory of CPU31 and output to CPU31 upon initiating determination of orientation of components.

In this chip-mounting apparatus, since the origin O on the receptor 53 is determined based on the actual positional relationship of the light source 52, the receptor 53, and the nozzle member 45, the condition that center line Ro is perpendicular to the direction of alignment of the sensing elements of the line sensor 56 is satisfied with certainty.

Thus, the lengths of the cast shadow such as L1 can be accurately calculated. Further, distances Z and Zo can also be calculated based on the actual positional relationship of the light source 52, for example, and thus, the calculation is highly accurate. Further, since distance So between the nozzle center Cn and straight line Ro', i.e., the deviation of the nozzle center Cn with respect to the center line Ro shown in FIG. 7 is the memory, by using the distance So in calculating the distance from the nozzle center Cn to each side of the component 46, it is possible to detect the accurate orientation of the component even if the condition that the nozzle member 45 is on the center line Ro is not satisfied.

Accordingly, in this chip-mounting apparatus, compensations ΔX, ΔY, and Δθ for compensating for misalignment can very accurately be calculated, thereby achieving highly accurate operation of chip-mounting.

The above-explained determination of reference position may be conducted upon installation of a chip-mounting apparatus or before shipment thereof, or may be periodically conducted to renew data regarding distance Z, for example, in the memory. In the latter, distortion which occurs in the chip-mounting apparatus with time can be compensated for by using the redetermined origin O on the receptor 53 and distance Z, for example. Accordingly, high performance can be maintained.

Further, the present invention does not limit its application to the above embodiment. Various modification may be conducted within the breath of the invention.

For example, if the measurements of a component are known, after detecting distances L1 and L3 on the receptor 53 when the component is positioned as shown by the solid line in FIGS. 7 and 8, compensations ΔX and ΔY can be calculated based on distances a and c and the length of each short and long sides of he component, which can be calculated using L1 and L3.

Figure 9:
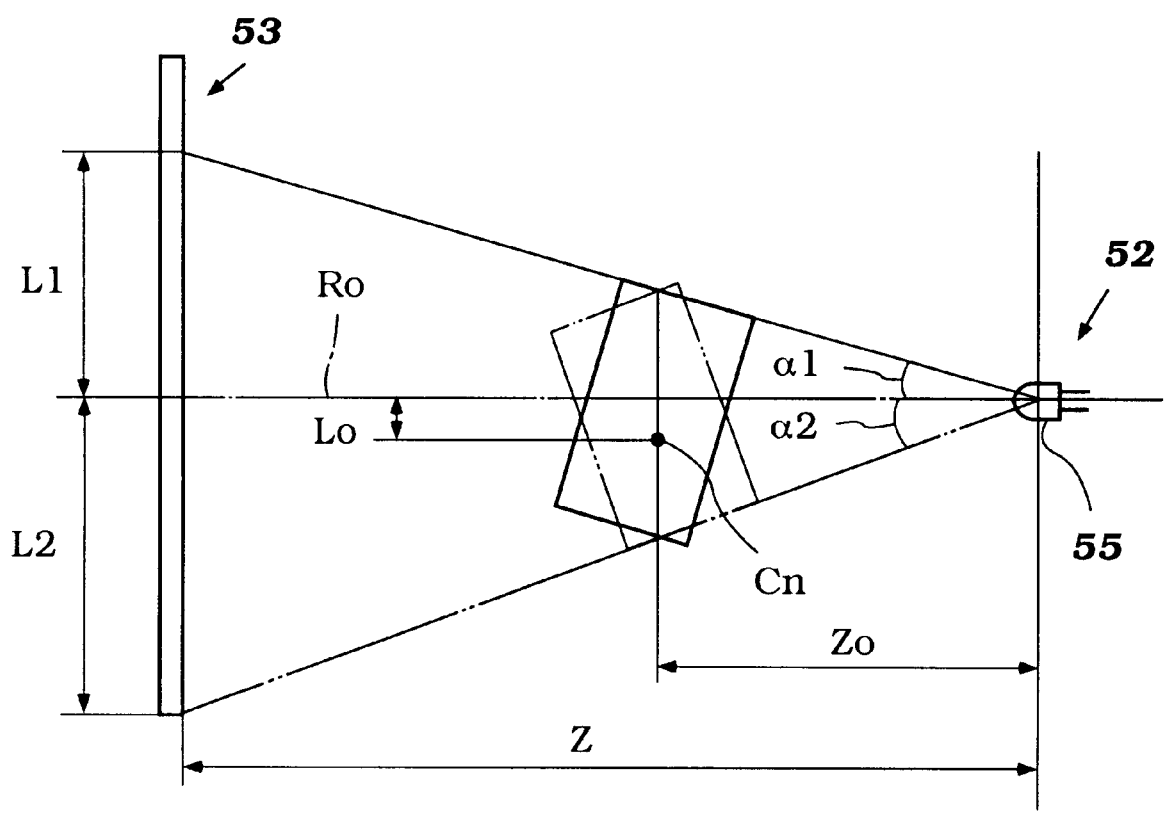
FIG. 9 is a graphic view showing a method of determining the orientation of a component in another positional relationship of the receptor, light source, and nozzle member.

In addition, the nozzle center Cn need not be positioned on the center line Ro. As shown in FIG. 9, the nozzle center Cn can deviate from the center line Ro to one side. In this embodiment, when the distance between the nozzle center Cn and each side of the component 46 is calculated based on distance L1 and L2 (and L3 and L4) where the distance between the origin O on the receptor 53 and the end of the cast shadow of the component is minimized, distance Lo between the center line Ro and the nozzle center Cn is taken into consideration.

Figure 13:
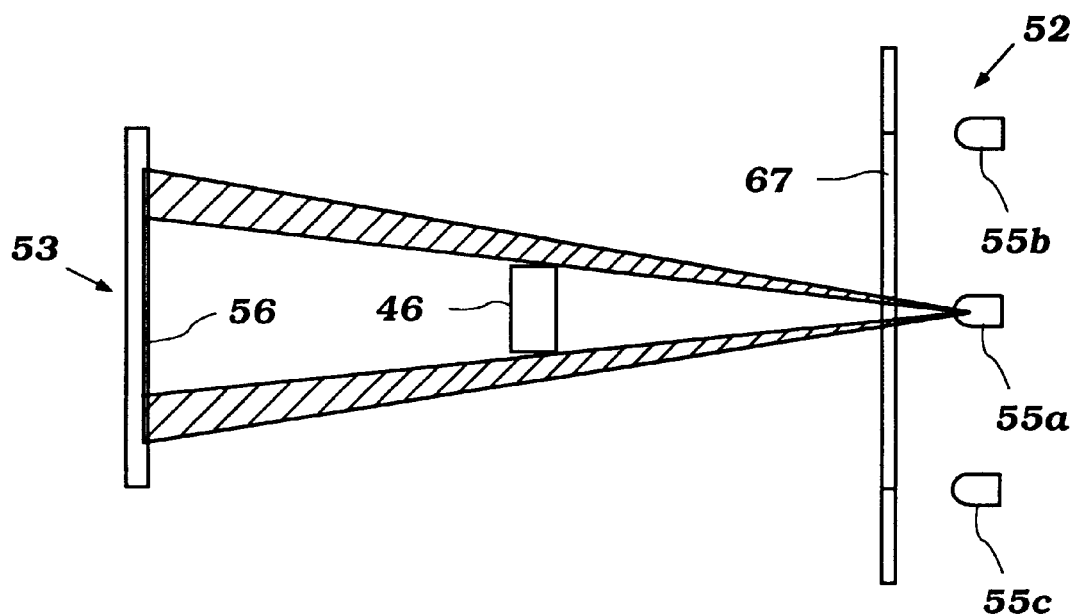
FIG. 13a is a graphic view showing another embodiment having three light elements wherein the light element located in the middle is used.
FIG. 13b is a graphic view showing another embodiment having three light elements wherein the light elements located on the sides are used.
Figure 13:
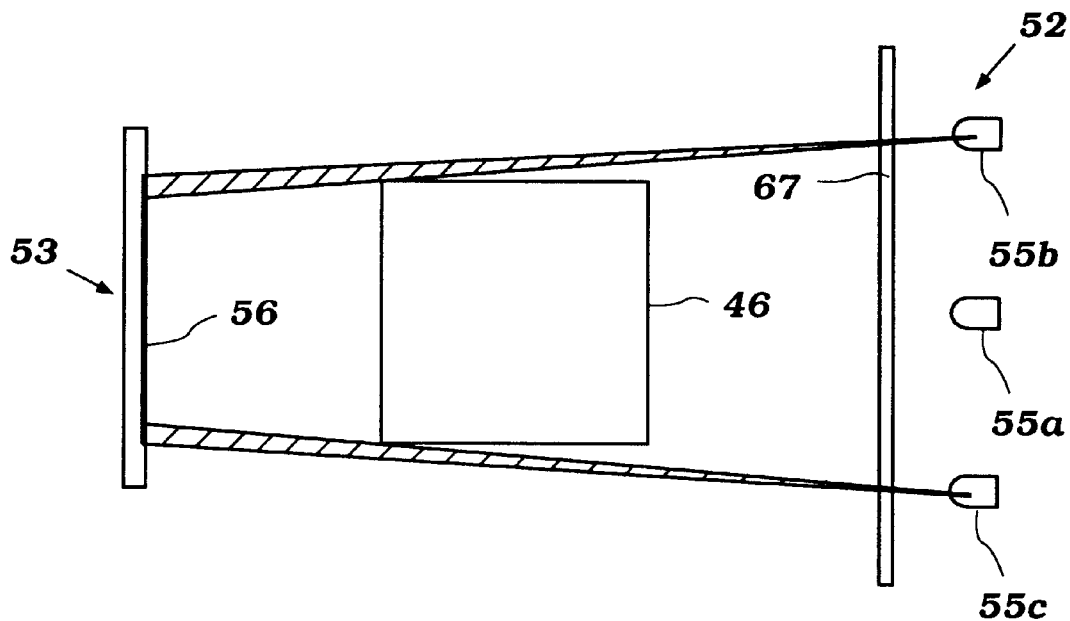

The light source 52 of the detection unit 26 can further comprise a second light element 55b and a third light element 55c arranged next to the first light element 55a as shown in FIG. 13. When detecting a relatively small component 46, the first light element 55a emits light as shown in FIG. 13a. When detecting a relatively large component 46, the second and third light elements 55b and 55c emit light as shown in FIG. 13b, thereby confining the range of a cast shadow on the receptor 53. Thus, the length of the line sensor 56 can be shortened. This embodiment is suitable when the component has a size sufficient to overlap shadows cast by the second and third light elements 55b and 55c on the receptor 53. The flowchart of FIG. 6 can be used in this embodiment, wherein the angle of rotation and the distance where the distance between the origin and the end of the shadow is minimized are detected, thereby calculating the compensation values according to the orientation of the component.

Figure 14:
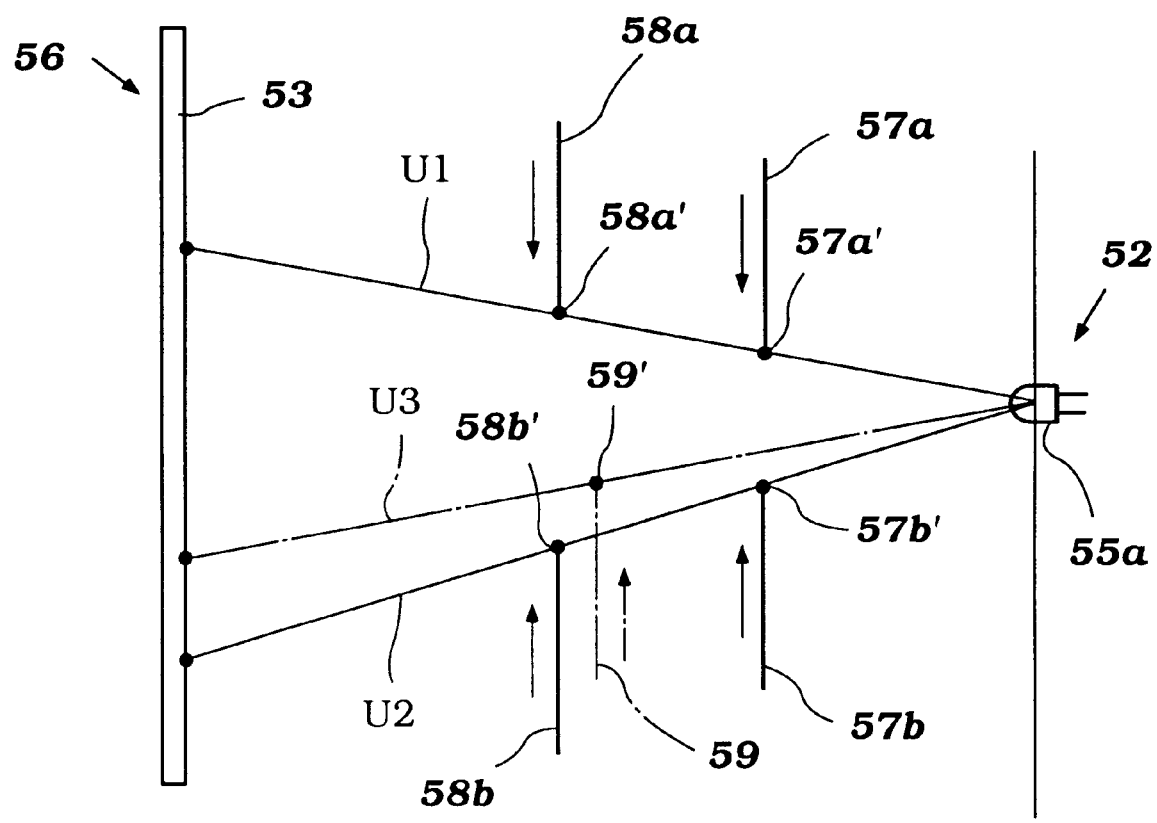
FIG. 14 is a graphic view showing another embodiment of determining the reference position wherein slit-forming members are used.

Determination of the reference position of the component can be performed without the use of the dummy member 46. For example, a first slit formed by slit-forming members 57a and 57b slidable in the Y-axial direction (the vertical dire ion in the figure), which are disposed between the light source 52 and the receptor 53, can be used as shown in FIG. 14. Further, a second slit formed by slit-forming members 58a and 58b slidable in the Y-axial direction are disposed closer to the receptor 53 than is the first slit. The positions of these slits are detectable. In addition, between the light source 52 and the receptor 53, a light-blocking member 59 slidable in the Y-axial direction is disposed. The position of the member is detectable.

First, after each of the slit-forming members 57a and 57b is slid to a given position where a given slit width between the slit-forming members 57a and 57b is formed, the width of the light cast on the receptor 53 is measured, and each position of the edges 57a' and 57b' of the slit-forming members 57a and 57b is detected. In the above, the slit width of the second slit is set larger than that of the first slit, and the light-blocking member 59 is retracted.

The slit width of the second slit is then narrowed by sliding the slit-forming members 58a and 58b until the width of the light cast on the receptor 53 is not narrowed. Each position of the edges 58a' and 58b' of the slit-forming members 58a and 58b is then measured. In other words, equations of straight lines for specific lays U1 and U2, which define the ends of the light cast on the receptor 53, can be calculated based on the positions of the edges 57a' and 57b' of the slit-forming members 57a and 57b and the positions of the edges 58a' and 58b' of the slit-forming members 58a and 58b. Further, the position of the light element 55 can also be calculated from the above equations of the straight lines.

When sliding the light-blocking member 59 to block the diffused light, the width of the light cast on the receptor 53 is detected, and the position of the edge 59' of the light-blocking member 59 is also detected. Based on the position of the edge 59' of the light-blocking member 59 and the position of the light element 55, the equation of the straight line for a specific lay U3 is calculated.

Accordingly, after determining the equations of the straight lines for the specific lays U1–U3, the position of the light element 55, and the width of each light cast on the receptor 53, the origin O is determined on the receptor 53 using each equation after Equation 6. Distance Z, for example, can be determined accordingly.

In the above, the light-blocking member 59 does not need to be a separate member, i.e., one of the slit-forming members can be used as a light-blocking member. Further, the slit-forming members 57a and 57b forming the first slit do not need to be slidable, i.e., they may be fixed so as to form a given slit width.

Although the aforesaid chip-mounting apparatus has one nozzle member 45 in the head unit 51, the apparatus can have plural nozzle members.

This apparatus provides an arrangement for conveniently measuring the location of the component and determining the offsetting calculations to be made so that it can be accurately positioned, using the reference position. This apparatus differs from the conventional apparatus in that the actual time for measuring is consistent regardless of the positioning of the component, and in that, by accurately determining the reference position corresponding to the actual positional relationship of the light source, the receptor, and the nozzle member, highly accurate determination of the orientation of components can be performed. The reference position can be determined by using a dummy member or slit-forming members. Various other changes and modifications may be made without departing from the spirit and scope of the invention, as defined by the appended claims.

What is claimed is:

1. A method for determining a reference position for optically detecting the orientation of a test piece, comprising the steps of:

(i) picking up the test piece by a rotatable pick-up device, said pick-up device having an axis of rotation and being adapted to pick up the test piece, said test piece having corners with constant dimensions with respect to the axis of rotation;

(ii) positioning the test piece between a light source and a light sensor;

(iii) emitting light from the light source toward the light sensor and casting a shadow of the test piece onto the light sensor;

(iv) detecting a first position of one end of the shadow when the pickup device rotates at a first angle, where the distance between a given position and the first position on the light sensor is minimized;

(v) detecting a second position of the other end of the shadow when the pick-up device rotates at a second angle, where the distance between the given position and the second position on the light sensor is minimized;

(vi) detecting a third position of either end of the shadow when the pick-up device rotates at a predetermined third angle; and (vii) determining as a reference position the positional relationship of the light source, the light sensor, and the pick-up device, based on the positional data obtained in steps (iv)–(vi).

2. A method for determining a reference position according to claim 1, wherein said light source comprise two light elements and, in step (iii), one end of the shadow corresponds to light from one of the two light elements, and the other end of the shadow corresponds to light from the other light element.

3. A method for determining a reference position for optically detecting the orientation of a test piece, comprising the steps of:

(i) picking up the test piece by a rotatable pick-up device, said pick-up device having the axis of rotation and being adapted to pick up the test piece, said test piece having sides wherein one side is longer than the other side, said test piece having corners with known dimensions with respect to the axis of rotation;

(ii) positioning the test piece between a light source and a light sensor;

(iii) emitting light from the light source toward the light sensor and casting a shadow of the test piece onto the light sensor;

(iv) detecting a first position of one end of the shadow when the pickup device rotates at a first angle, where one side of the test piece is aligned with a lay of the diffused light and where the distance between a given position and the first position on the light sensor is minimized;

(v) detecting a second position of the end of the shadow when the pick-up device rotates at a second angle, where the other side of the test piece is aligned with a lay of the diffused light and where the distance between the given position and the second position on the light sensor is minimized;

(vi) detecting a third position of the end of the shadow when the pickup device rotates at a predetermined third angle; and (vii) determining as a reference position the positional relationship of the light source, the light sensor, and the pick-up device, based on the positional data obtained in steps (iv)–(vi).

4. A system for determining a reference position for optically detecting the orientation of a test piece, comprising:

a rotatable pick-up device for picking up the test piece, said pick-up device having an axis of rotation and being adapted to pick up the component, said test piece having comers with constant dimensions with respect to the axis of rotation;

a light sensor for sensing light to detect the position of a shadow thereon;

a light source for emitting light diffusing toward the light sensor, wherein said light sensor and said light source are spaced at a transverse distance;

a drive for positioning the test piece between the light source and the light sensor and rotating the pick-up device;

a reader for: reading a first position of one end of the shadow when the pick-up device rotates at a first angle, where the distance between a given position and the first position on the light sensor is minimized; reading a second position of the other end of the shadow when the pick-up device rotates at a second angle, where the distance between the given position and the second position on the light sensor is minimized; and reading a third position of either end of the shadow when the pick-up device rotates at a predetermined third angle; and determining means for determining as a reference position the positional relationship of the light source, the light sensor, and the pick-up device, based on the system configuration and the positional data obtained by the reader.

5. A system for determining a reference position according to claim 4, wherein said light source comprised two light elements, wherein one end of the shadow corresponds to light from one of the two light elements, and the other end of the shadow corresponds to light from the other light element.

* * * * *